United States Patent
Chan et al.

(10) Patent No.: US 10,763,683 B2
(45) Date of Patent: Sep. 1, 2020

(54) ELECTRONIC DEVICE AND CHARGING CONTROL METHOD USING THE SAME

(71) Applicant: Wistron Corporation, New Taipei (TW)

(72) Inventors: Ivan Y Chan, New Taipei (TW); Beryl Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 422 days.

(21) Appl. No.: 15/839,825

(22) Filed: Dec. 12, 2017

(65) Prior Publication Data
US 2019/0058334 A1    Feb. 21, 2019

(30) Foreign Application Priority Data
Aug. 18, 2017   (CN) .......................... 2017 1 0711436

(51) Int. Cl.
*H02J 7/00*  (2006.01)
*H02J 7/34*  (2006.01)

(52) U.S. Cl.
CPC ............ *H02J 7/007* (2013.01); *H02J 7/0047* (2013.01); *H02J 7/0068* (2013.01); *H02J 7/345* (2013.01); *H02J 7/00045* (2020.01)

(58) Field of Classification Search
CPC .......... H02J 7/007; H02J 7/345; H02J 7/0068; H02J 7/0047; H02J 7/00045; H02J 7/0029; G06F 21/81
(Continued)

(56) References Cited

U.S. PATENT DOCUMENTS 5,751,950 A * 5/1998 Crisan .................... G06F 21/57
                                                     713/310
6,105,140 A * 8/2000 Crisan .................... G06F 21/81
                                                     713/310
(Continued)

FOREIGN PATENT DOCUMENTS

CN        105048555        11/2015
CN        105353857         2/2016
(Continued)

OTHER PUBLICATIONS

"Office Action of Taiwan Counterpart Application", dated Nov. 13, 2018, p. 1-p. 9.
(Continued)

*Primary Examiner* — M Baye Diao
(74) *Attorney, Agent, or Firm* — JCIPRNET

(57) ABSTRACT

An electronic device and a charging control method using the same are provided. The electronic device includes a power input port, a battery module, a power supply circuit, and a processor. The power input port is configured to receive an external power. The battery module supplies stored power to the electronic device. The power supply circuit has a default charging identification code. When the external power is supplied to the electronic device through the power input port, the power supply circuit obtains a user charging identification code through the processor and compares whether the user charging identification code matches the default charging identification code. When the user charging identification code matches the default charging identification code, the power supply circuit starts to charge the battery module.

9 Claims, 3 Drawing Sheets

(58) Field of Classification Search
USPC .......................................................... 320/128
See application file for complete search history.

(56) References Cited

U.S. PATENT DOCUMENTS

| | | | | |
|---|---|---|---|---|
| 6,326,771 | B1* | 12/2001 | Popescu-Stanesti | ........................ H02J 7/0068 320/139 |
| 6,459,175 | B1* | 10/2002 | Potega | .................... H02J 9/061 307/149 |
| 6,707,284 | B2* | 3/2004 | Lanni | ...................... H02M 3/00 323/297 |
| 6,856,654 | B1* | 2/2005 | Carkner | ............... H04B 15/005 375/295 |
| 6,969,972 | B2* | 11/2005 | Formenti | ................. G06F 1/263 320/128 |
| 7,057,309 | B2* | 6/2006 | Odaohhara | ............. G06F 1/263 307/150 |
| 7,058,484 | B1* | 6/2006 | Potega | ................ H02J 7/00041 700/297 |
| 7,638,975 | B2* | 12/2009 | Nakamiya | ............. H02J 7/0029 320/134 |
| 7,701,084 | B2* | 4/2010 | Youn | ...................... H01R 29/00 307/29 |
| 8,120,323 | B2* | 2/2012 | Lai | ...................... H02M 1/4225 320/128 |
| 8,754,545 | B2* | 6/2014 | Wai | .......................... H02J 7/34 307/66 |
| 9,543,788 | B2* | 1/2017 | Recker | ...................... H02J 7/34 |
| 9,859,725 | B2* | 1/2018 | Nowak | ................. H02J 7/0047 |
| 10,312,725 | B2* | 6/2019 | Su | ........................ H02J 7/0071 |
| 10,345,880 | B2* | 7/2019 | Shpiro | .................... G06F 1/266 |
| 2004/0178681 | A1* | 9/2004 | Klenner | ................... H02J 9/061 307/66 |
| 2004/0198320 | A1* | 10/2004 | Cheng | .................... G06F 21/35 455/411 |
| 2012/0252532 | A1 | 10/2012 | Williams | |
| 2014/0253047 | A1* | 9/2014 | Horie | ................ H02J 7/007192 320/150 |
| 2019/0006722 | A1* | 1/2019 | Kim | .................... H02J 7/00041 |

FOREIGN PATENT DOCUMENTS

| | | |
|---|---|---|
| CN | 105809002 | 7/2016 |
| TW | M460450 | 8/2013 |

OTHER PUBLICATIONS

"Office Action of Taiwan Counterpart Application," dated Apr. 18, 2019, p. 1-p. 8.

* cited by examiner

ELECTRONIC DEVICE AND CHARGING CONTROL METHOD USING THE SAME

CROSS-REFERENCE TO RELATED APPLICATION

This application claims the priority benefit of China application serial no. 201710711436.5, filed on Aug. 18, 2017. The entirety of the above-mentioned patent application is hereby incorporated by reference herein and made a part of this specification.

BACKGROUND OF THE INVENTION

Field of the Invention

The invention relates to a control technique of an electronic device, and in particular, to an electronic device and a charging control method.

Description of Related Art

With the development of electronic technologies, consumer electronic products have been designed to be more and more convenient, and charging ports of many electronic products have been gradually unified. When a consumer electronic product (e.g., a laptop, a smartphone, or a tablet computer) is lost, whether the electronic product still has power, any individual who finds the electronic product may employ a range of means (e.g., rooting, replacement of a chipset, replacement of a battery, etc.) to have the electronic product continue to be used by other people for obtaining personal information of the original user, illegally selling the electronic product, etc., which thus results in issues of privacy and security.

In the current art, to charge an electronic product, the user only needs to connect a charging cable compatible with a charging port of the electronic product to a power source. Privacy or security protection of the electronic product is usually achieved through software means by the user's manually inputting a numeric password or pattern lock to identify the user and determine whether to unlock the electronic product. Since charging ports of electronic devices including laptops, smartphones, and tablet computers have been gradually unified, privacy and security of the electronic devices are also put to test.

SUMMARY OF THE INVENTION

The invention provides an electronic device and a charging control method using the same, wherein privacy and security of the electronic device are strengthened through hardware, such that non-owners of the electronic device are prevented from performing a charging operation on the electronic device, and data in the electronic device are further protected.

The electronic device of the invention includes a power input port, a battery module, a power supply circuit, and a processor. The power input port is configured to receive an external power. The battery module supplies stored power to the electronic device. The power supply circuit is coupled to the power input port and the battery module, wherein the power supply circuit has a default charging identification code. The processor is coupled to the battery module and the power supply circuit. When the external power is supplied to the electronic device through the power input port, the power supply circuit obtains a user charging identification code through the processor and compares whether the user charging identification code matches the default charging identification code. When the user charging identification code matches the default charging identification code, the power supply circuit starts to charge the battery module.

The invention provides a charging control method for an electronic device, the charging control method including the steps below: determining whether an external power is supplied to the electronic device through the power input port; obtaining a user charging identification code through the processor when the external power is supplied to the electronic device through the power input port; comparing whether the user charging identification code matches a default charging identification code stored in the power supply circuit; and, starting to charge the battery module when the user charging identification code matches the default charging identification code.

In light of the above, the electronic device of the embodiments of the invention has the default charging identification code default in the power supply circuit at the time of leaving the factory. When the external power is supplied to the electronic device through the power input port, the processor displays the user interface to allow a user to input the charging identification code. The power supply circuit then detects whether the charging identification code inputted by the user is identical to or matches the default charging identification code. If the charging identification code inputted by the user is not identical to or does not match the default charging identification code, it means that the user is not the owner of the electronic device. At this time, the power supply circuit prevents the user from charging the electronic device. Accordingly, privacy and security of the electronic device are strengthened through hardware of the electronic device, such that non-owners of the electronic device are prevented from performing the charging operation, and data in the electronic device are further protected.

To provide a further understanding of the aforementioned and other features and advantages of the disclosure, exemplary embodiments, together with the reference drawings, are described in detail below.

DESCRIPTION OF THE EMBODIMENTS

Figure 1:
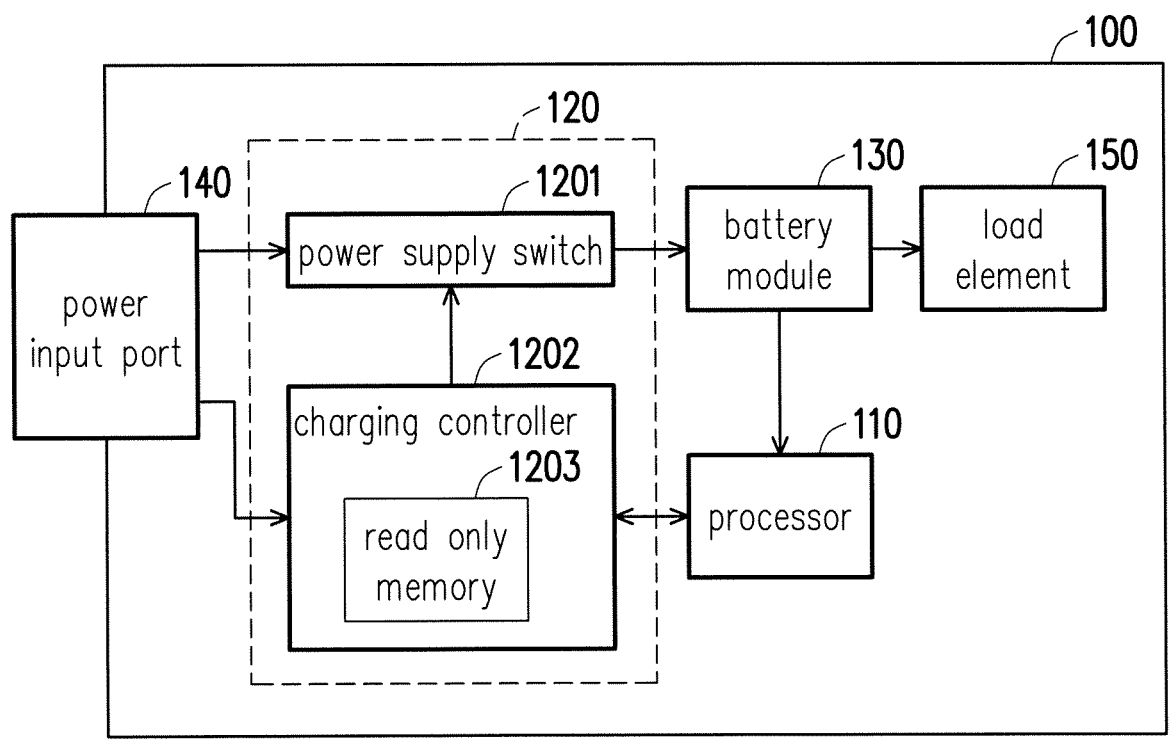
FIG. 1 is a schematic diagram illustrating an electronic device according to an embodiment of the invention.

FIG. 1 is a schematic diagram illustrating an electronic device according to an embodiment of the invention. In the present embodiment, an electronic device 100 may be any of various types of electronic devices including a rechargeable battery, such as a mobile phone, a smartphone, a tablet computer, a laptop, a gamer, etc.

Referring to FIG. 1, the electronic device 100 includes a processor 110, a power supply circuit 120, a battery module 130, and a power input port 140. In the present embodiment, the electronic device 100 further includes a load element 150. The load element 150 is coupled to the battery module 130 to operate through power supplied by the battery module 130. The load element 150 may include other components in the electronic device 100, such as a control circuit, an intermediate frequency circuit, a radio-frequency circuit, etc. The load element 150 may further include a display, an input device, or even the processor 110 in the electronic device 100 in the embodiment below.

The processor 110 is coupled to the power supply circuit 120 and the battery module 130. The processor 110 of the present embodiment receives an interrupt request (IRQ) transmitted by the power supply circuit 120 to obtain a user charging identification code through one or more manners (e.g., allowing user input by displaying a user interface, allowing user input by setting a fingerprint, or allowing user input by a pattern lock) according to the interrupt request, and transmit the user charging identification code back to the power supply circuit. Moreover, the processor 110 is also configured to measure a battery state signal of the battery module 130 to detect a battery state any time. The battery state signal may include a battery voltage, a battery temperature, a battery type, a state for battery connection, etc. The processor 110 may be a central processing unit (CPU), a digital signal processor (DSP), a programmable microprocessor, a programmable logic device (PLD), an application specific integrated circuit (ASIC), or another hardware device having computational capacity of the electronic device 100.

The power supply circuit 120 stores a default charging identification code and is coupled to the battery module 130 and the power input port 140 to be configured to control a charging state of the battery module 130 and determine whether to charge the battery module 130. When an external power is connected to the power input port 140, the power supply circuit 120 obtains the user charging identification code through the processor 110 and compares the default charging identification code originally stored in the power supply circuit 120 and the user charging identification code provided by the processor 110. If the default charging identification code and the user charging identification code provided by the processor 110 match each other, it means that the user is the owner of the electronic device 100 or a concerned person having the right to charge the electronic device 100, and the power supply circuit 120 may then start to charge the battery module 130.

In the present embodiment, the power supply circuit 120 includes a power supply switch 1201 and a charging controller 1202. The power supply switch 1201 is configured to control conduction of a path from the external power to the battery module 130. In the present embodiment, the charging controller 1202 may have a voltage protection function to ensure that the charging state is ended by switching off the power supply switch 1201 when the voltage of the battery module 130 is greater than a threshold value (the threshold value is, for example, 4.3V). The charging controller 1202 may also have a wake-up charging function to wake up the battery module 130 from a sleep state through controlling the power supply switch 1201. Since the battery module 130 may enter the sleep state when the battery module 130 is fully discharged or self-discharges until its voltage is lower than a threshold, the charging controller 1202 may control the power supply switch 1201 to use a smaller charging current to raise the voltage of the battery module 130 to a working interval to wake up the battery module 130 (the working interval is, for example, 2.2V to 2.9V).

The charging controller 1202 is coupled to the power supply switch 1201. The charging controller 1202 includes a read only memory 1203 to store the default charging identification code and is configured to control the power supply switch 1201. When the charging controller 1202 detects that the external power is connected to the power input port 140, the charging controller 1202 provides the interrupt request to the processor, the processor 110 then activates the user interface according to the interrupt request and obtains the user charging identification code via the user interface to generate a charging response signal including the user charging identification code, and the charging controller 1202 compares the default charging identification code and the user charging identification code provided by the processor 110. Then, the charging controller 1202 receives the charging response signal and compares whether the user charging identification code in the charging response signal matches the default charging identification code. If the default charging identification code and the user charging identification code provided by the processor 110 match each other, the charging controller 1202 controls the power supply switch 1201 such that the battery module 130 enters the charging state.

In the present embodiment, the charging controller 1202 may have an analog-to-digital converting function to convert an analog voltage value detected at the power input port 140 into a digital signal, and to determine whether the external power is connected to the power input port 140 according to the digital signal. If the charging controller 1202 determines the digital signal as successful connection, the charging controller 1202 transmits the interrupt request to the processor 110. In the present embodiment, the charging controller 1202 may be a chip formed by an integrated circuit (IC).

The read only memory 1203 is configured to store the default charging identification code. In the present embodiment, the read only memory 1203 may be a general read only memory (ROM), a programmable ROM (PROM), an erasable programmable read only memory (EPROM), a one time programmable read only memory (OTPROM), an electrically erasable programmable read only memory (EEPROM), etc. In the present embodiment, it is intended that the read only memory 1203 is configured to store the default charging identification code, so that the default charging identification code will continue to be stored in the read only memory 1203 of the charging controller 1202 after the electronic device 100 leaves the factory.

The electronic device 100 further includes a system data bus and an interrupt controller. The system data bus is coupled to the processor 110, and the interrupt controller is coupled to the charging controller 1202. The charging controller 1202 provides the interrupt request to the interrupt controller through a driver pack of a hardware system bottom layer of a motherboard of the electronic device 110. The charging controller 1202 transmits the interrupt request to the interrupt controller through a plurality of pins, and the interrupt controller outputs a signal to interrupt pins of the processor 110 via the system data bus according to the interrupt request. Therefore, when the charging controller 1202 is replaced with another charging controller, the another charging controller cannot know how to access or use the driver pack of the hardware system bottom layer of the motherboard of the electronic device 100. For the foregoing reason, the processor 110 will not be able to recognize the interrupt request provided by the another charging controller, so the processor 110 cannot transmit the charging response signal including the user charging identification code, which causes the user charging identification code to be unable to match the default charging identification code in the another charging controller.

The battery module 130 is configured to supply stored power to the electronic device 100. In the present embodiment, the battery module 130 may be a lithium battery module, a lithium polymer (Li—Po) battery module, or a nickel-metal hydride battery (Ni-MH battery) module.

The power input port 140 is configured to receive the external power and may be any of various types of universal serial bus (USB) ports, such as a general USB port, a micro USB port, a mini USB port, or a USB t e-C port.

Figure 2:
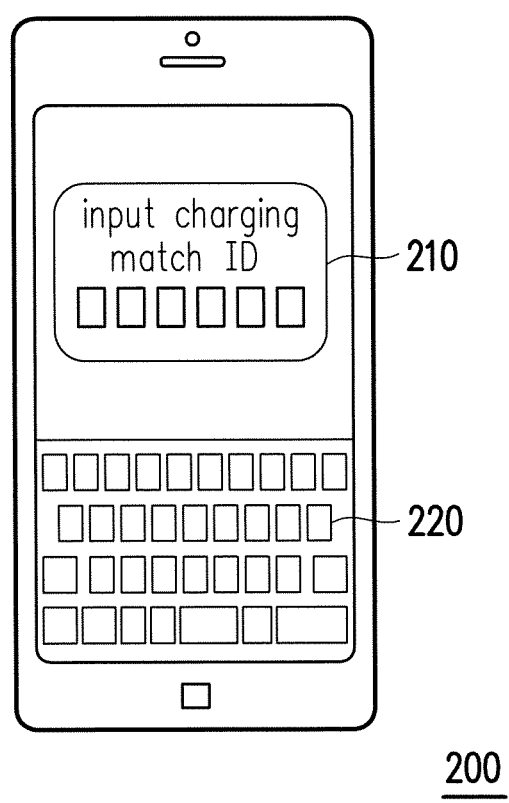
FIG. 2 is a schematic diagram illustrating a user interface according to an embodiment of the invention.

FIG. 2 is a schematic diagram illustrating a user interface according to an embodiment of the invention. Referring to FIG. 2, an electronic device 200 in the present embodiment corresponds to the electronic device 100 of FIG. 1. The present embodiment is described below with reference to the components in the electronic device 100. In the present embodiment, the electronic device 200 includes a display 210 and an input device 220, wherein the display 210 may be a liquid-crystal display (LCD), a light-emitting diode (LED) display, an organic light-emitting diode (OLED) display, or a polymer light-emitting diode (PLED) display, and the input device 220 may be a physical keyboard, a virtual keyboard, or a writing pad. The display 210 and the input device 220 are coupled to the processor 110, wherein the processor 110 displays the user interface on the display 210 by a hardware interrupt (namely, generating an interrupt signal by hardware to oblige the processor to respond immediately) after receiving the interrupt request, and obtains the user charging identification code through the input device 220. If the user charging identification code is successfully inputted, the processor 110 transmits the user charging identification code to the power supply circuit 120. If the user charging identification code is not successfully inputted, the processor 110 does not transmit the user charging identification code, or the processor 110 transmits a response signal that does not include the user charging identification code to the power supply circuit 120, and the power supply circuit 120 does not charge the battery module 130.

Figure 3:
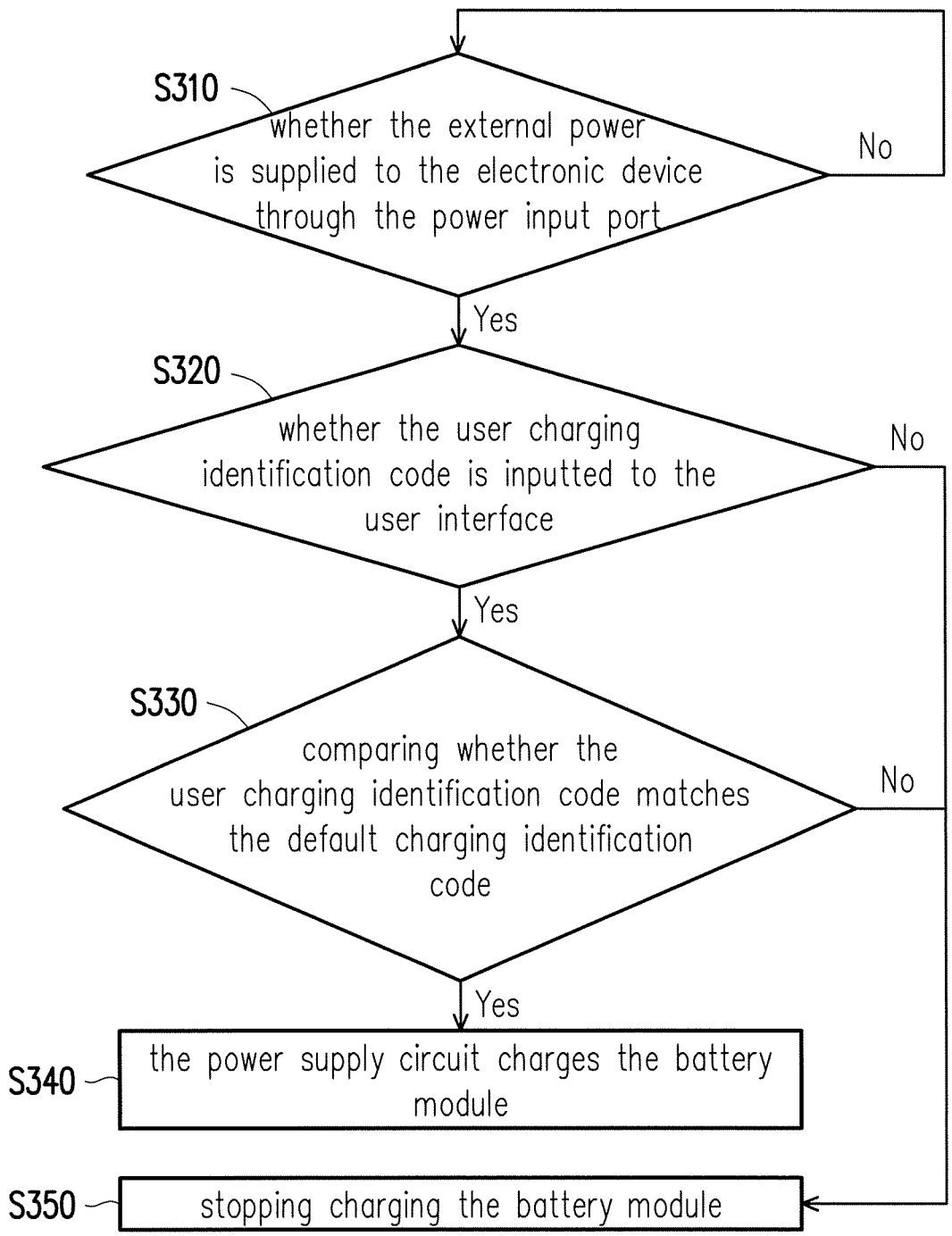
FIG. 3 is a flowchart illustrating a charging control method according to an embodiment of the invention.

FIG. 3 is a flowchart illustrating a charging control method according to an embodiment of the invention. The method of the present embodiment is suitable for the electronic device 100 of FIG. 1. Detailed steps of the charging control method are described below with reference to the components in the electronic device 100.

In step S310, the power supply circuit 120 determines through the charging controller 1202 whether the external power is supplied to the electronic device 100 through the power input port 140. In the present embodiment, the charging controller 1202 may convert an analog voltage into a digital signal through an analog-to-digital converting unit to detect whether the external power is already supplied to the electronic device 100 through the power input port 140.

In the present embodiment, if the charging controller 1202 determines that the external power is already supplied to the electronic device 100 through the power input port 140, the charging controller 1202 generates an interrupt request through the driver pack of the hardware system bottom layer of the motherboard of the electronic device 110. Conversely, if the charging controller 1202 cannot determine that the external power is supplied to the electronic device 100 through the power input port 140, an initial state is maintained until it is determined that the external power is supplied to the electronic device 100 through the power input port 140.

However, when the charging controller 1202 is replaced with another charging controller, since the hardware system bottom layer of the motherboard of the electronic device 100 cannot recognize the another charging controller, the another charging controller cannot access the driver pack of the hardware system bottom layer of the motherboard of the electronic device 100, such that the processor 110 cannot transmit a charging response signal including a user charging identification code to the another charging controller according to an interrupt request provided by the another charging controller, which causes the user charging identification code to be unable to match a default charging identification code in the another charging controller. Therefore, the another charging controller ends a charging procedure of the power supply switch 1201.

In step S320, when the processor 110 recognizes the interrupt request provided by the charging controller 1202, the processor 110 generates a user interface (see FIG. 2). Accordingly, a user may input the user charging identification code. The processor 110 then transmits the user charging identification code back to the charging controller 1202, and the charging controller 1202 reads the default charging identification code from the read only memory 1203.

In step S330, the charging controller 1202 compares whether the user charging identification code matches the default charging identification code. When the user charging identification code matches the default charging identification code, entering step S340 from step S330, the charging controller 1202 controls the power supply switch 1201 to start to charge the battery module 130. Conversely, when the user charging identification code does not match the default charging identification code, entering step S350 from step S330, the charging controller 1202 controls the power supply switch 1201 to stop charging the battery module 130. In other words, only when the user charging identification code matches the default charging identification code and the processor obtains a recognizable user charging identification code will the procedure enter step S340 to charge the battery module 130. On the other hand, if the user charging identification code does not match the default charging identification code or the processor cannot obtain the user charging identification code, the procedure will enter step S350 to end charging the battery module 130.

In summary of the above, the electronic device of the embodiments of the invention has the default charging identification code default in the power supply circuit at the time of leaving the factory. When the external power is supplied to the electronic device through the power input port, the processor displays the user interface to allow the user to input the charging identification code. The power supply circuit then detects whether the charging identification code inputted by the user is identical to or matches the default charging identification code. If the charging identification code inputted by the user is not identical to or does not match the default charging identification code, it means that the user is not the owner of the electronic device. At this time, the power supply circuit prevents the user from charging the electronic device. Accordingly, privacy and security of the electronic device are strengthened through hardware of the electronic device, such that non-owners of the electronic device are prevented from performing the charging operation, and data in the electronic device are further protected. Furthermore, the control circuit of the power supply circuit matches the motherboard of the electronic device at the time of leaving the factory. Therefore, it is impossible to replace the control circuit of the power supply circuit to achieve the purpose of charging. In light of the above, the invention configures two-way protection on the electronic device that prevents non-owners from charging the electronic device to steal the data or steal it for sale.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An electronic device comprising:
a power input port configured to receive an external power;
a battery module supplying stored power to the electronic device;
a power supply circuit coupled to the power input port and the battery module, wherein the power supply circuit has a default charging identification code; and
a processor coupled to the battery module and the power supply circuit,
wherein when the external power is supplied to the electronic device through the power input port, the power supply circuit obtains a user charging identification code through the processor and compares whether the user charging identification code matches the default charging identification code, and
when the user charging identification code matches the default charging identification code, the power supply circuit starts to charge the battery module,
wherein the power supply circuit comprises:
a power supply switch configured to control conduction of a path from the external power to the battery module; and
a charging controller coupled to the power supply switch, the charging controller comprising a read only memory for storing the default charging identification code,
wherein when the external power is supplied to the electronic device through the power input port, the charging controller provides an interrupt request to the processor, and the processor activates a user interface according to the interrupt request, obtains the user charging identification code via the user interface, and generates a charging response signal comprising the user charging identification code.

2. The electronic device according to claim 1, wherein when the user charging identification code does not match the default charging identification code, or the processor is unable to obtain the user charging identification code, the power supply circuit does not charge the battery module.

3. The electronic device according to claim 1, wherein the charging controller receives the charging response signal and compares whether the user charging identification code in the charging response signal matches the default charging identification code, and
when the user charging identification code matches the default charging identification code, the charging controller switches on the path from the external power to the battery module through the power supply switch to charge the battery module.

4. The electronic device according to claim 3, further comprising:
a system data bus coupled to the processor; and
an interrupt controller coupled to the charging controller,
wherein the charging controller provides the interrupt request to the interrupt controller through a driver pack of a hardware system bottom layer of a motherboard of the electronic device, and
when the charging controller is replaced with another charging controller, the another charging controller is unable to access the driver pack of the hardware system bottom layer of the motherboard of the electronic device, such that the charging response signal comprising the user charging identification code is not obtained from the processor according to the interrupt request provided by the another charging controller, which causes the user charging identification code to be unable to match the default charging identification code in the another charging controller.

5. The electronic device according to claim 3, further comprising:
a display coupled to the processor; and
an input device coupled to the processor,
wherein the processor displays the user interface on the display by a hardware interrupt after receiving the interrupt request and obtains the user charging identification code through the input device.

6. A charging control method for an electronic device, the electronic device comprising a power input port, a battery module, a power supply circuit, and a processor, the charging control method comprising:
determining whether an external power is supplied to the electronic device through the power input port;
obtaining a user charging identification code through the processor when the external power is supplied to the electronic device through the power input port;
comparing whether the user charging identification code matches a default charging identification code stored in the power supply circuit; and
starting to charge the battery module when the user charging identification code matches the default charging identification code,
wherein the step of obtaining the user charging identification code through the processor comprises steps of:
providing an interrupt request to the processor; and
activating a user interface according to the interrupt request and obtaining the user charging identification code via the user interface by the processor.

7. The charging control method according to claim 6, further comprising:
not charging the battery module when the user charging identification code does not match the default charging identification code, or the processor is unable to obtain the user charging identification code.

8. The charging control method according to claim 6, wherein the interrupt request is generated through a driver pack of a hardware system bottom layer of a motherboard of the electronic device.

9. The charging control method according to claim 8, wherein the charging control method is implemented by a charging controller, and when the charging controller is replaced with another charging controller, the another charging controller is unable to access the driver pack of the hardware system bottom layer of the motherboard of the electronic device, such that a charging response signal comprising the user charging identification code is not obtained from the processor according to the interrupt request provided by the another charging controller, which causes the user charging identification code to be unable to match the default charging identification code in the another charging controller.

* * * * *